(12) United States Patent
Brockerhoff

(10) Patent No.: US 9,093,929 B2
(45) Date of Patent: Jul. 28, 2015

(54) CIRCUIT ARRANGEMENTS AND METHODS FOR OPERATING AN ELECTRICAL MACHINE

(71) Applicant: Infineon Technologies AG, Neubiberg (DE)

(72) Inventor: Philip Georg Brockerhoff, Munich (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 91 days.

(21) Appl. No.: 13/716,230

(22) Filed: Dec. 17, 2012

(65) Prior Publication Data

US 2014/0167654 A1 Jun. 19, 2014

(51) Int. Cl.
*H02P 1/00* (2006.01)
*H02P 7/00* (2006.01)
*H02P 25/18* (2006.01)

(52) U.S. Cl.
CPC .................. *H02P 7/00* (2013.01); *H02P 25/18* (2013.01); *Y10S 903/903* (2013.01)

(58) Field of Classification Search
CPC ...... H02P 7/2985; H02P 9/00; Y02T 10/7005
USPC .............. 318/139, 105, 106; 363/15; 388/806
See application file for complete search history.

(56) References Cited

U.S. PATENT DOCUMENTS

| | | | |
|---|---|---|---|
| 7,239,099 B2 | 7/2007 | Weinmann | |
| 8,369,049 B2 | 2/2013 | Kuehner et al. | |
| 8,786,226 B2 | 7/2014 | Vollmer et al. | |
| 2009/0033253 A1 | 2/2009 | Nagashima et al. | |
| 2009/0033274 A1 | 2/2009 | Perisic et al. | |
| 2009/0134700 A1 | 5/2009 | Tanaka et al. | |
| 2011/0149611 A1* | 6/2011 | Moussaoui et al. | 363/21.04 |
| 2013/0114166 A1 | 5/2013 | Schoenknecht et al. | |

FOREIGN PATENT DOCUMENTS

| | | |
|---|---|---|
| DE | 102005009341 A1 | 5/2006 |
| DE | 102006003254 A1 | 7/2007 |
| DE | 102008034662 A1 | 2/2009 |
| DE | 102008034663 A1 | 2/2009 |
| DE | 102009045351 A1 | 4/2011 |
| DE | 102010003595 A1 | 10/2011 |
| DE | 102010062334 A1 | 6/2012 |
| DE | 102012203525 A1 | 9/2013 |

(Continued)

OTHER PUBLICATIONS

Gabriele Grandi et al., Dual inverter space vector modulation with power balancing capability, EUROCON 2009, EUROCON '09. IEEE, May 18-23, 2009, pp. 721-728.

Junha Kim et al., Dual inverter control strategy for high speed operation of EV induction moters, IECON 02 [Industrial Electronics Society, IEEE 2002 28th Annual Conference of the IEEE Industrial Electronics Society], Nov. 5-8, 2002, pp. 163-168.

(Continued)

*Primary Examiner* — Karen Masih

(57) ABSTRACT

A circuit arrangement is described comprising a first battery; a second battery; an electrical machine connected between the first battery and the second battery wherein the electrical machine is connected to the first battery via a first switching arrangement and the electrical machine is connected to the second battery via a second switching arrangement and a controller configured to control the first switching arrangement and the second switching arrangement such that a current that has a DC component flows through the electrical machine.

23 Claims, 17 Drawing Sheets

(56) References Cited

FOREIGN PATENT DOCUMENTS

WO 2012072311 A1 6/2012
WO 2013131738 A1 9/2013

OTHER PUBLICATIONS

Office Action issued in the corresponding German application No. 102013112147.0, dated Jul. 7, 2014.

* cited by examiner

1300

CIRCUIT ARRANGEMENTS AND METHODS FOR OPERATING AN ELECTRICAL MACHINE

TECHNICAL FIELD

The present disclosure relates to circuit arrangements and methods for operating an electrical machine.

BACKGROUND

Car manufacturers are planning to equip cars with an electrical motor in addition to a combustion engine for saving fuel in the near future. For this, it is planned to include an additional power system (e.g. a 48V system) in addition to the conventional 12V power system. Efficient approaches to couple these two power systems are desirable.

SUMMARY

According to one embodiment, a circuit arrangement is provided including a first battery; a second battery; an electrical machine connected between the first battery and the second battery wherein the electrical machine is connected to the first battery via a first switching arrangement and the electrical machine is connected to the second battery via a second switching arrangement and a controller configured to control the first switching arrangement and the second switching arrangement such that a current that has a DC component flows through the electrical machine.

According to another embodiment, a circuit arrangement is provided including a first battery; a second battery; an electrical machine connected between the first battery and the second battery wherein the electrical machine is connected to the first battery via a first switching arrangement and the electrical machine is connected to the second battery via a second switching arrangement and wherein the electrical machine is connected to the second switching arrangement via a plurality of terminals; and a controller configured to control the second switching arrangement, in response to the detection of an error of the second switching arrangement or the second battery, such that the terminals are short-circuited by means of the second switching arrangement.

According to a further embodiment, a circuit arrangement is provided including a first battery; a second battery; an electrical machine connected between the first battery and the second battery wherein the electrical machine is connected to the first battery via a first switching arrangement and the electrical machine is connected to the second battery via a second switching arrangement; and a controller configured to control the first switching arrangement and the second switching arrangement such that the first battery supplies electric power to drive the electrical machine and the electric machine supplies power to the second battery to charge the second battery.

According to further embodiments, methods for operating an electrical machine according to the above circuit arrangements are provided.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION

The following detailed description refers to the accompanying drawings that show, by way of illustration, specific details and aspects of this disclosure in which the invention may be practiced. These aspects of this disclosure are described in sufficient detail to enable those skilled in the art to practice the invention. Other aspects of this disclosure may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

To allow a stronger hybridization compared to an extended start/stop system in a car various car manufacturers will probably introduce a 48V on-board power supply with an electrical machine of e.g. about 10 kW which is coupled directly or via a belt with the combustion engine. The aim of such a system is to reduce the fuel consumption by about 15% at a cost of below 1000 €. An example of a vehicle including such as system is illustrated in FIG. 1.

Figure 1:
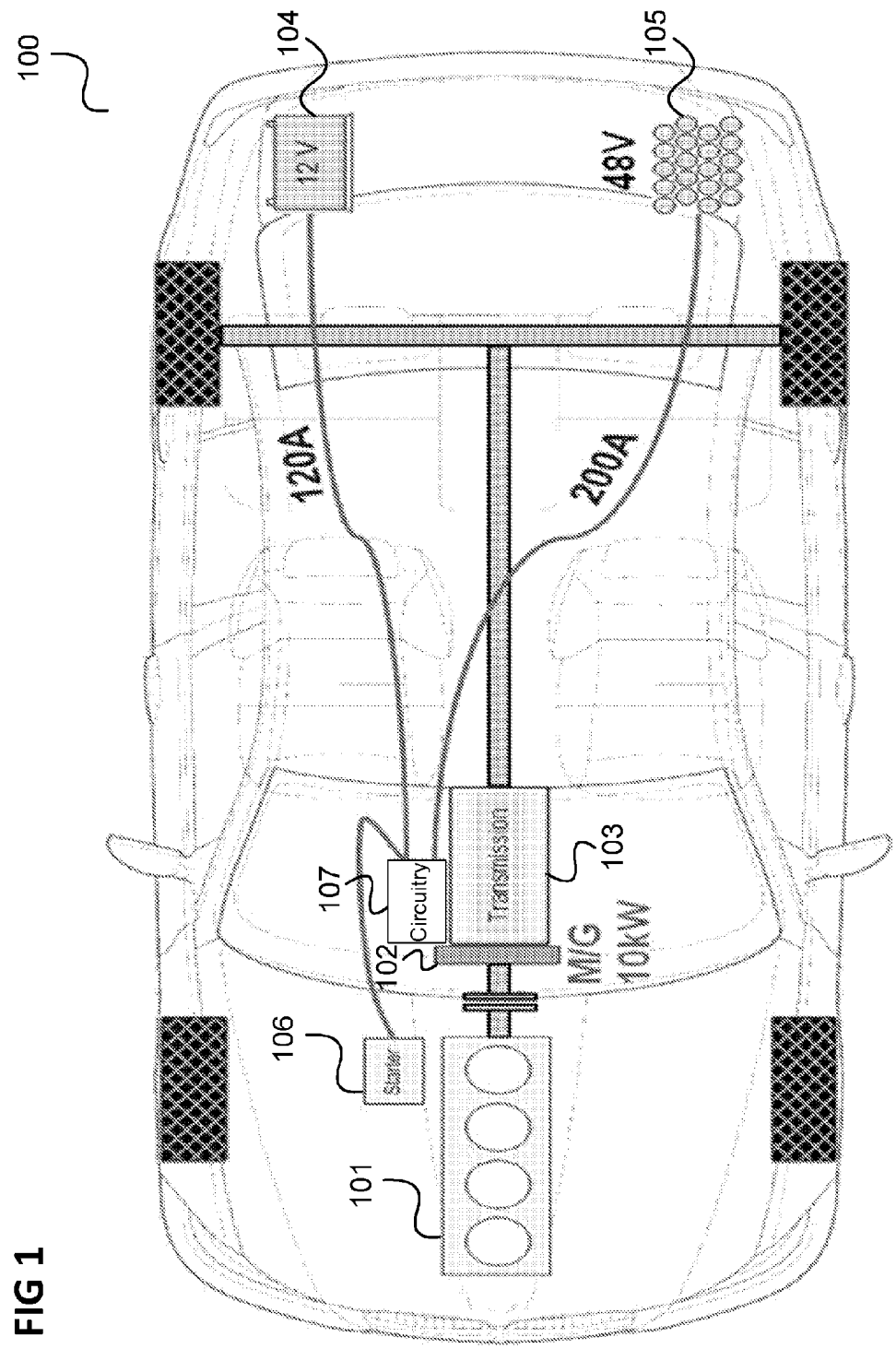
FIG. 1 shows a car with a 12V power system and a 48V power system.

FIG. 1 shows a car 100.

The vehicle 100 includes a combustion engine 101, an electrical machine 102 (electric motor), a transmission 103, a 12V power supply 104 and a 48V power supply 105.

The 12V power supply 104 for example powers a starter 106 for starting the combustion engine 101.

The 12V power supply 104 and the 48V power supply 105 are coupled to the electric machine 102 via circuitry 107.

The circuitry 107 may for example include an inverter for coupling the 48V power supply to the electric machine 102 and a (additional) DCDC converter for coupling the 12V power supply 104 to the 48V power supply 105. Such a coupling by means of a DCDC converter is illustrated in FIG. 2.

Figure 2:
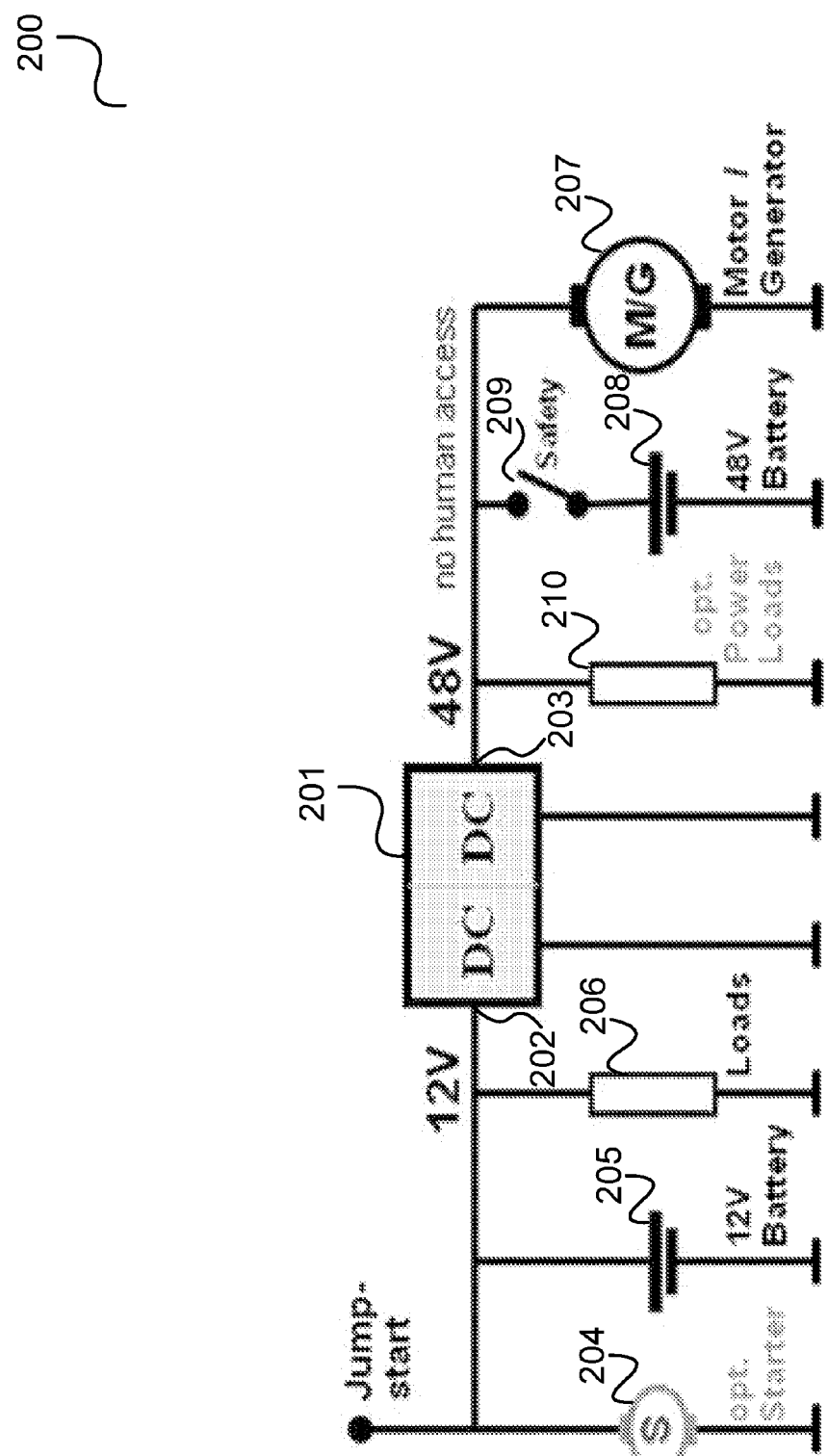
FIG. 2 shows a circuit with coupling of the 12V power supply with the 48V power supply by means of a DCDC converter.

FIG. 2 shows a circuit 200 with coupling of the 12V power supply with the 48V power supply by means of a DCDC converter.

The circuit 200 includes a DCDC converter 201 which has a first terminal 202 for connecting the 12V power supply side and a second terminal 203 for connecting the 48V power supply side.

The DCDC converter 201 is further connected to a ground terminal.

On the 12V power supply side, a starter 204 (e.g. corresponding to starter 106), a 12V battery 205 (e.g. corresponding to 12 V power supply 104) and one or more loads 206 (e.g. lighting, radio, etc.) are connected to the first terminal 202 (e.g. between the first terminal 202 and the ground terminal).

On the 48V power supply side, an electrical machine 207 (e.g. corresponding to electrical machine 102), a 48V battery 208 (e.g. corresponding to 48 V power supply 105), e.g. coupled to the second terminal 203 via a safety switch 209, and one or more power loads 210 are connected to the second terminal 203 (e.g. between the second terminal 203 and the ground terminal).

Figure 3:
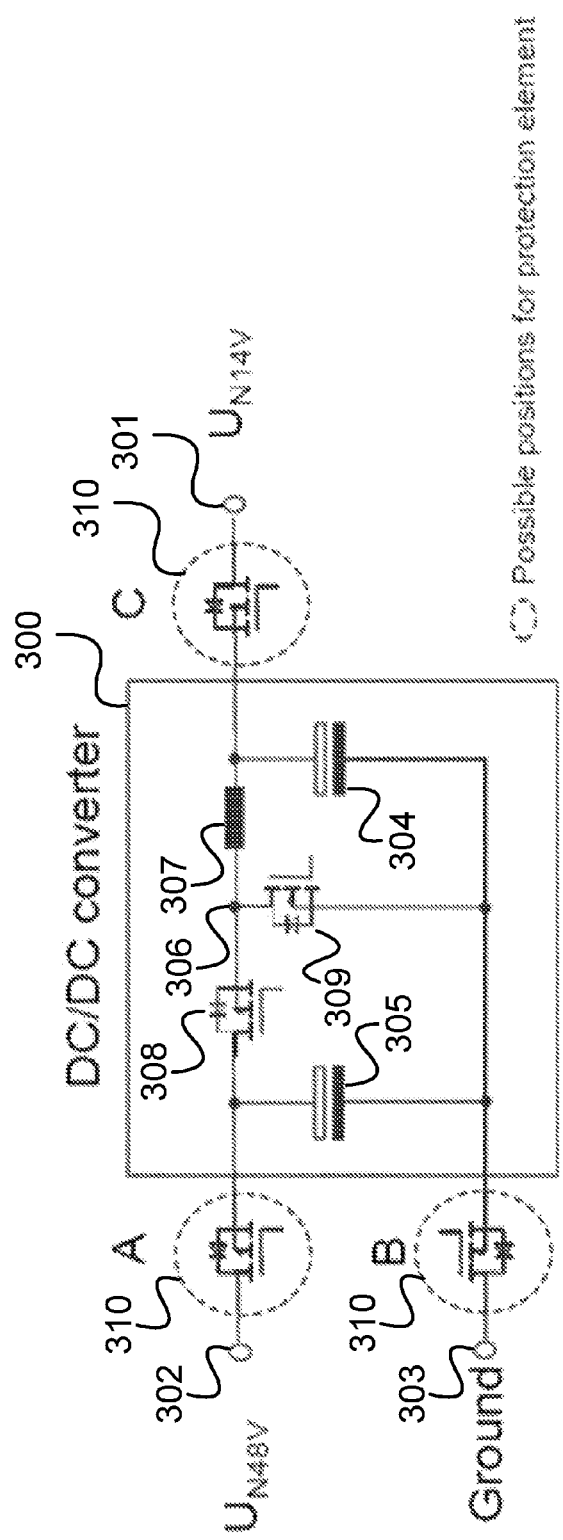
FIG. 3 shows a DCDC converter.

The DCDC converter 201 is for example implemented as illustrated in FIG. 3.

FIG. 3 shows a DCDC converter 300.

The DCDC converter 300 includes a first terminal 301 for coupling with a 12V power supply system, a second terminal 302 for coupling with a 48V power supply system and a ground terminal 303 for coupling with ground.

The first terminal 301 and the second terminal 302 are connected to the ground nodes by a first capacitor 304, 305, respectively. The first terminal 301 is coupled to a center node 306 by means of an inductor 307, the second terminal 302 is coupled to the center node by means of a first switch (e.g. a field effect transistor) 308 and the ground terminal 303 is coupled to the center node 306 by means of a second switch 309.

One or more further switches 310 arranged at the terminals 301, 302, 303 may be necessary to securely separate the 12V power supply and the 48V power supply. These further switches 310 reduce the efficiency and cause additional costs. Further, the inductor 307 for the DCDC converter 300 adds additional weight, cost and space requirement to the system.

An alternative to the coupling via a DCDC converter is the usage of the star point (by adjusting the start point potential and coupling the star point with the 12V power supply) of the electrical machine (electrical motor/generator) for transmitting energy to the 12V power supply side.

Examples described in the following are based on a system in which the first battery (e.g. 12V battery) is coupled to the electrical machine via a first switching arrangement (e.g. a first inverter, i.e. inverted rectifier) and the second battery (e.g. 48V battery) is coupled to the electrical machine via a second switching arrangement (e.g. a second inverter).

Examples of circuit arrangements that may be provided and may be seen to be based on such an coupling of a first battery and a second battery via an electrical machine (operable as motor and/or generator) are described in the following.

Figure 4:
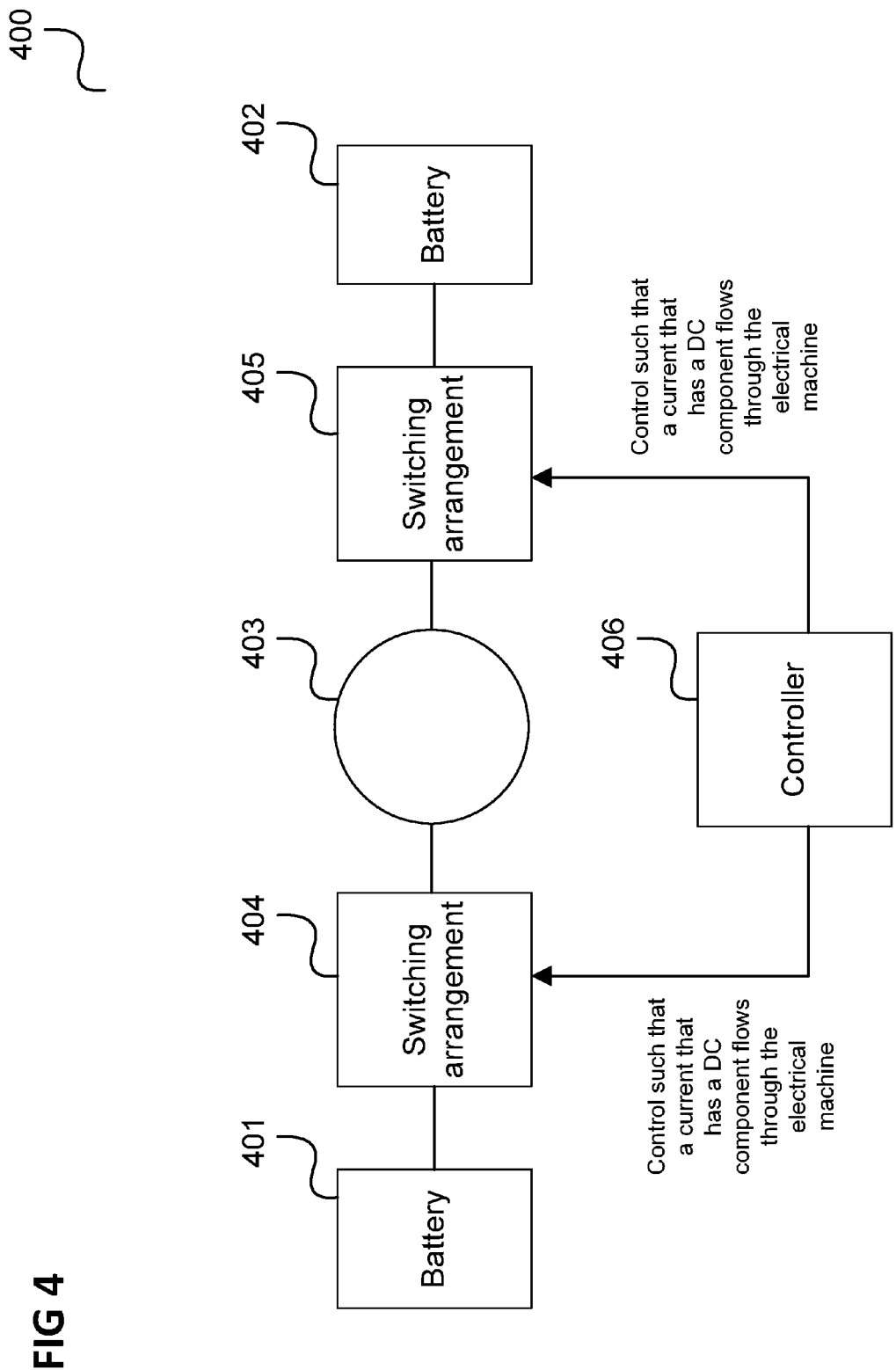
FIG. 4 shows a circuit arrangement.

FIG. 4 shows a circuit arrangement 400.

The circuit arrangement 400 includes a first battery 401, a second battery 402 and an electrical machine 403 connected between the first battery 401 and the second battery 402.

The electrical machine 403 is connected to the first battery 401 via a first switching arrangement 404 and the electrical machine 403 is connected to the second battery 402 via a second switching arrangement 405.

The circuit arrangement 400 further includes a controller 406 configured to control the first switching arrangement 404 and the second switching arrangement 405 such that a current that has a (non-zero) DC component flows through the electrical machine 403.

In other words, according to one embodiment, a controller controls switching arrangements coupling batteries of different voltages to an electric machine such that DC current is transferred from one battery to the other battery, for example to charge one of the batteries by means of the other battery.

According to one embodiment, the first switching arrangement is coupled to the electrical machine via a multi-phase connection and the second switching arrangement is coupled to the electrical machine via a multi-phase connection.

The machine is for example a three-phase machine and the first switching arrangement is for example coupled to the electrical machine via a three-phase connection and the second switching arrangement is for example coupled to the electrical machine via a three-phase connection.

The electrical machine for example has three branches, wherein each branch has a first terminal connected to the first battery via the first switching arrangement and a second terminal connected to the second battery via the second switching arrangement.

According to one embodiment, the controller is configured to control the first switching arrangement and the second switching arrangement such that a current that has a DC component flows through at least one of the branches of the electrical machine.

According to one embodiment, the controller is configured to control the first switching arrangement and the second switching arrangement such that a current that has a DC component flows through the electrical machine DC component above a pre-determined threshold.

According to one embodiment, the controller is configured to control the first switching arrangement and the second switching arrangement such that a current that has a DC component flows from the first battery to the second battery via the electrical machine.

At least one of the first switching arrangement and the second switching arrangement may be an inverter.

According to one embodiment, the controller is configured to control the first switching arrangement and the second switching arrangement such that the first switching arrangement, the electrical machine and the second switching arrangement act as a DCDC converter.

The controller may be configured to control the first switching arrangement and the second switching arrangement such that the first switching arrangement, the electrical machine and the second switching arrangement act as a step-down converter or a boost converter.

The electrical machine is for example a vehicle motor.

The first battery and the second battery are for example vehicle batteries.

According to one embodiment, the first battery and the second battery have different voltages.

For example, the first battery is a 12V car battery and the second battery is a 48V car battery.

Corresponding to wherein the circuit arrangement 400, according to one embodiment, a method for operating an electrical machine is provided that includes controlling a first switching arrangement, via which a first battery is coupled with the electrical machine, and a second switching arrangement, via which a second battery is coupled with the electrical machine, such that a current that has a DC component flows through the electrical machine.

Figure 5:
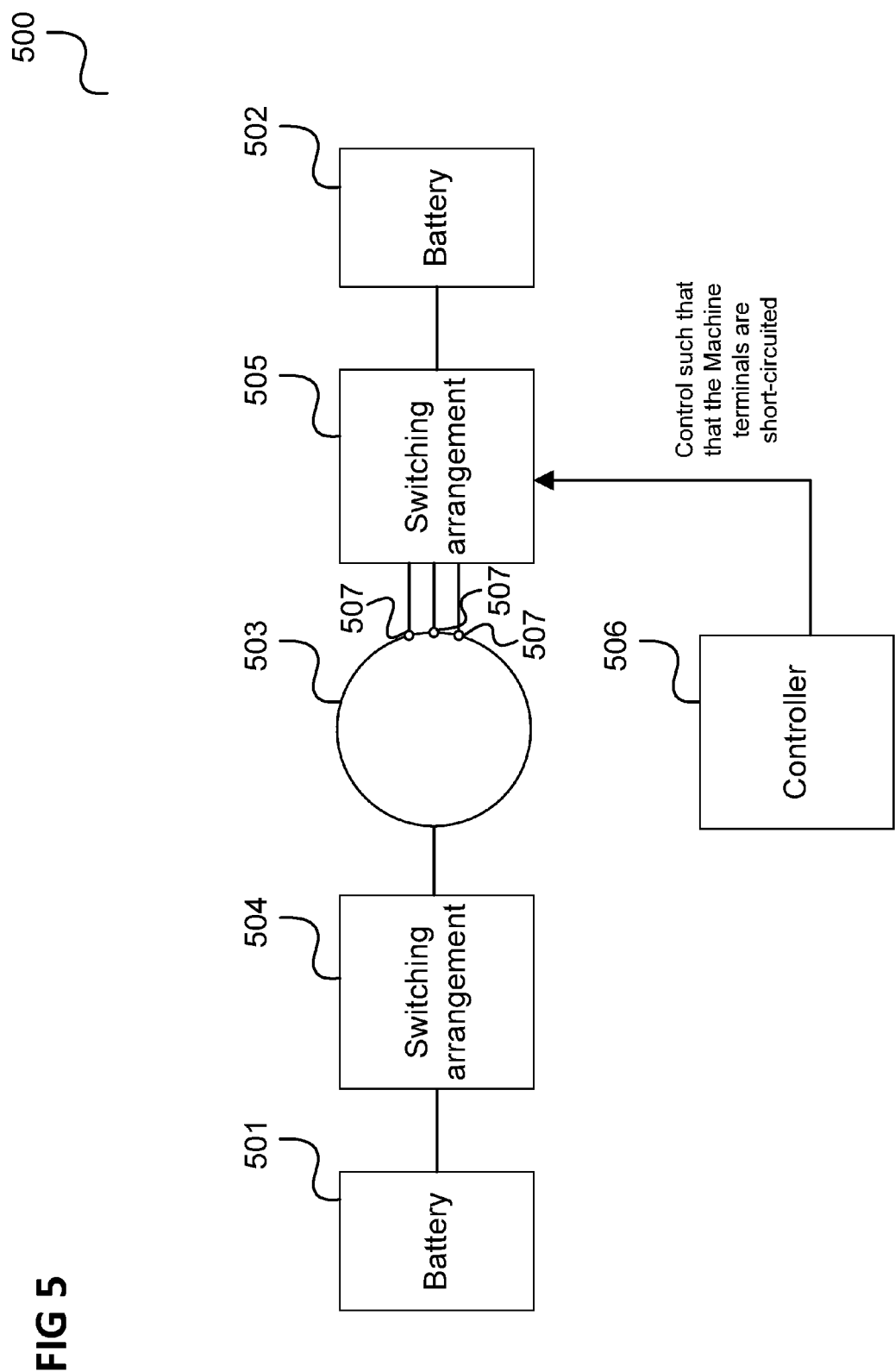
FIG. 5 shows a circuit arrangement.

FIG. 5 shows a circuit arrangement 500.

The circuit arrangement 500 includes a first battery 501, a second battery 502 and an electrical machine 503 connected between the first battery 501 and the second battery 502.

The electrical machine 503 is connected to the first battery 501 via a first switching arrangement 504 and the electrical machine 503 is connected to the second battery 502 via a second switching arrangement 505. The electrical machine 503 is connected to the second switching arrangement 505 via a plurality of terminals 507 (e.g. a number of terminals corresponding to the number of phases of the electrical machine).

The circuit arrangement 500 further includes a controller 506 configured to control the second switching arrangement 505, in response to the detection of an error of the second switching arrangement 505 or the second battery 504, such that the terminals 507 are short-circuited by means of the second switching arrangement 505.

In other words, a controller controls a switching arrangement via which a battery is coupled to an electrical machine such that the terminals via which the switching arrangement and the battery are coupled to the electrical machine are short-circuited, in other words the switching arrangement becomes a star point, in case that there is a malfunction of the switching arrangement or the battery. It should be noted that for example a malfunction of the connection (e.g. a cable) between the battery and the electrical machine is in this context also seen as a failure of the switching arrangement or the battery since the connection can be counted as part of the switching arrangement or the battery. For example, a short circuit of the connection between the battery and the electrical machine (e.g. caused by a malfunction of a component powered by the battery) may be seen as a failure of the connection and thus as a failure of the battery or the switching arrangement.

According to one embodiment, the electrical machine has three branches, wherein each branch is connect to the second switching arrangement by means of one terminal of the plurality of terminals.

The circuit arrangement for example further includes a detector configured to detect the error of the second switching arrangement or the second battery.

The second switching arrangement for example includes a plurality of switches and the error of the switching arrangement is for example a failure of one of the plurality of switches.

Corresponding to the circuit arrangement 500, according to one embodiment, a method for operating an electrical machine according to the above circuit arrangement is provided that includes controlling a switching arrangement, via which a battery is coupled with the electrical machine via a plurality of terminals, such that the terminals are short-circuited by means of the switching arrangement in response to the detection of an error of the switching arrangement or the battery.

Figure 6:
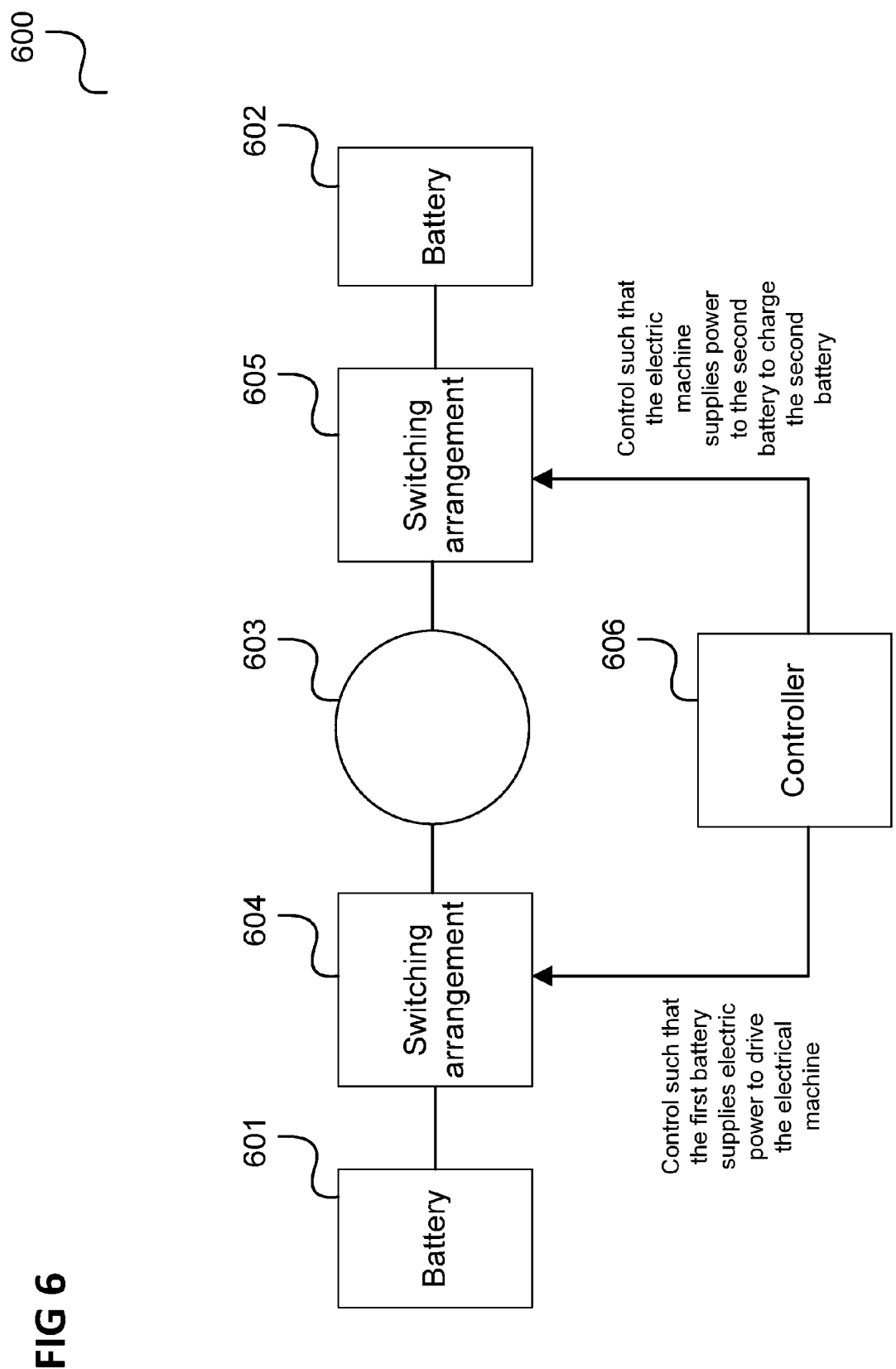
FIG. 6 shows a circuit arrangement.

FIG. 6 shows a circuit arrangement 600.

The circuit arrangement 600 includes a first battery 601, a second battery 602 and an electrical machine 603 connected between the first battery 601 and the second battery 602.

The electrical machine 603 is connected to the first battery 601 via a first switching arrangement 604 and the electrical machine 604 is connected to the second battery 602 via a second switching arrangement 605.

The circuit arrangement 600 further includes a controller 606 configured to control the first switching arrangement 604 and the second switching arrangement 605 such that the first battery 601 supplies electric power to drive the electrical machine 603 and the electric machine 603 supplies power to the second battery 602 to charge the second battery 602.

In other words, a controller controls switching arrangements via which batteries are connected to an electrical machine such that the electrical machine is in motor mode for one battery and for generator mode for the other battery, i.e. one battery supplies power to the electrical machine while the electrical machine charges the other battery.

According to one embodiment, the first switching arrangement and the second switching arrangement are inverters and are controlled based on space vector modulation or field oriented control. Alternatively, other feed-forward and feed-back control schemes (synchronous as well as asynchronous) may be used for controlling the inverters.

Corresponding to the circuit arrangement 600, according to one embodiment, a method for operating an electrical machine according to the above circuit arrangement is provided that includes controlling a first switching arrangement, via which a first battery is coupled with the electrical machine and a second switching arrangement, via which a second battery is coupled with the electrical machine such that the first battery supplies electric power to drive the electrical machine and the electric machine supplies power to the second battery to charge the second battery.

It should be noted that embodiments and aspects described in context of any of the circuit arrangements 400, 500, 600 are analogously valid for the other circuit arrangements 400, 500, 600 and the corresponding methods and vice versa.

The components such as the controller and the detector may for example be implemented by one or more circuits. A "circuit" may in this context be understood as any kind of a logic implementing entity, which may be special purpose circuitry or a processor executing software stored in a memory, firmware, or any combination thereof. Thus a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit".

The first switching arrangement 404, 504, 604 and the second switching arrangement 405, 505, 605 may each be an inverter (i.e. a DCAC converter) and may together for example form an inverter circuit in a three-phase implementation (or an implementation with another number of phases, e.g. a six phase implementation) connecting, via the electrical machine, two on-board power systems (and corresponding power supplies), e.g. a 12V power system (e.g. powered by a 12V battery) and a 48V power system (e.g. powered by a 48V battery). For this, each phase of the electrical machine is connected with both power systems (via the respective inverter). Possible applications are electrical machines (with higher power) in a vehicle, such as a hybrid electric motor, an electric steering support, an electric pump and a ventilator.

In the following, examples in which the switching arrangement are inverters are described in more detail.

Figure 7:
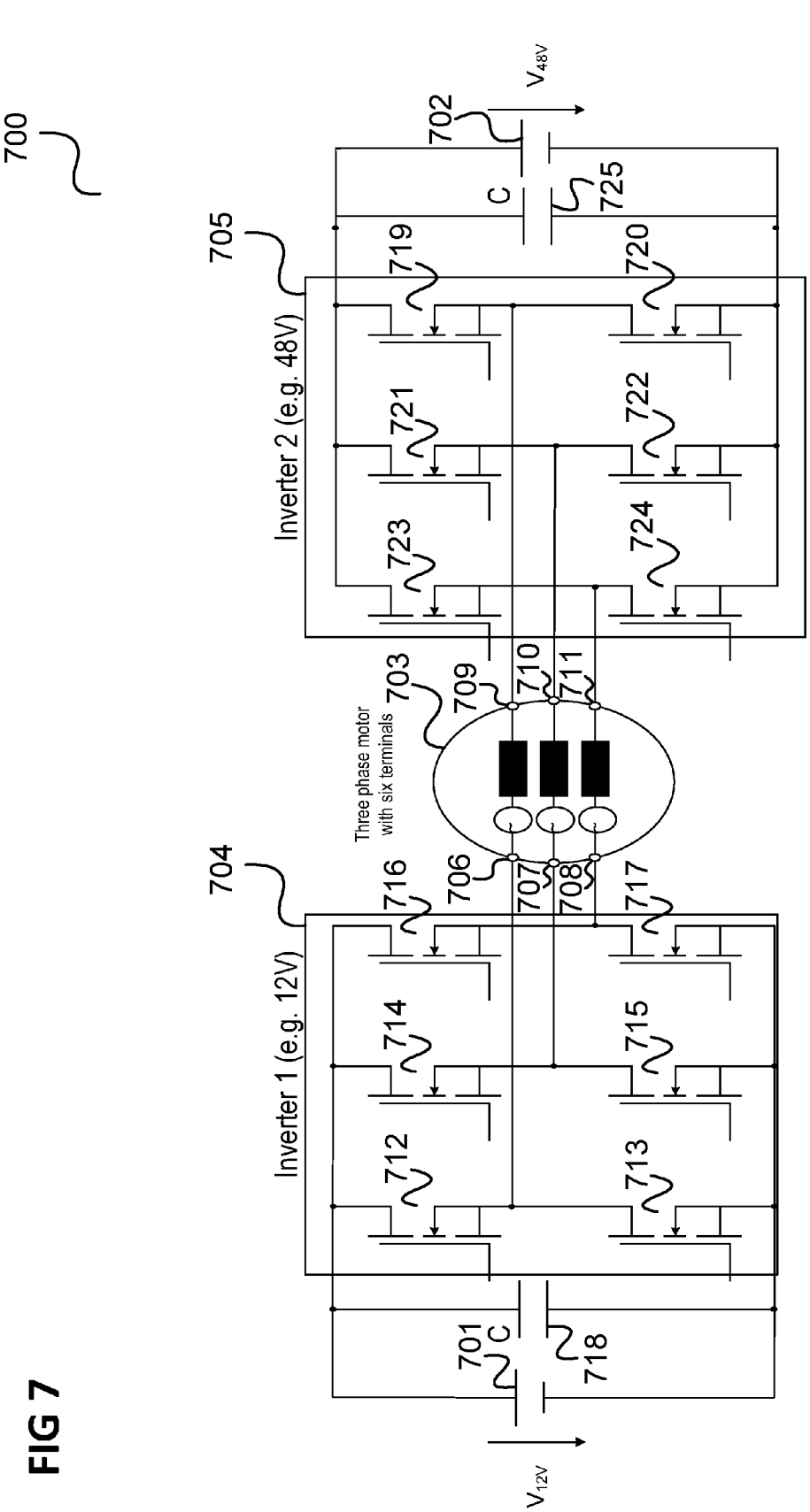
FIG. 7 shows a circuit arrangement.

FIG. 7 shows a circuit arrangement 700.

The circuit arrangement 700 includes a first battery 701 (a 12V battery in this example), a second battery 702 (a 48V battery in this example) and an electrical machine 703.

The first battery 701 is coupled to the electrical machine 703 via a first switching arrangement 704 and the second battery 702 is coupled to the electrical machine 703 via a second switching arrangement 705.

Specifically, the electrical machine includes a first terminal 706, a second terminal 707, a third terminal 708, a fourth terminal 709, a fifth terminal 710 and a sixth terminal 711.

The first switching arrangement 704 includes six switches 712 to 717, e.g. field effect transistors such as MOSFETS (Metal Oxide Semiconductor Field Effect Transistors), or, for an implementation for higher voltages, IGBTs (insulated-gate bipolar transistors).

The first switch 712 is coupled between the positive terminal of the first battery 701 and the first terminal 706 and the second switch 713 is coupled between the first terminal 706 and the negative terminal of the first battery 701. The third switch 714 is coupled between the positive terminal of the first battery 701 and the second terminal 707 and the fourth switch 715 is coupled between the second terminal 707 and the negative terminal of the first battery 701. The fifth switch 716 is coupled between the positive terminal of the first battery 701 and the third terminal 708 and the sixth switch 717 is coupled between the third terminal 708 and the negative terminal of the first battery 701.

Further, a first capacitor 718 is coupled between the positive terminal and the negative terminal of the first battery 701.

The second switching arrangement 705 includes six switches 719 to 720, e.g. field effect transistors such as MOSFETS (Metal Oxide Semiconductor Field Effect Transistors).

The first switch 719 is coupled between the positive terminal of the second battery 702 and the fourth terminal 709 and the second switch 720 is coupled between the fourth terminal 709 and the negative terminal of the second battery 702. The third switch 721 is coupled between the positive terminal of the second battery 702 and the fifth terminal 710 and the fourth switch 722 is coupled between the fifth terminal 710 and the negative terminal of the second battery 702. The fifth switch 723 is coupled between the positive terminal of the second battery 702 and the sixth terminal 711 and the sixth switch 724 is coupled between the sixth terminal 711 and the negative terminal of the second battery 702.

Further, a second capacitor 725 is coupled between the positive terminal and the negative terminal of the second battery 702.

It should be noted that between the first battery 701 and the first capacitor 718 as well as between the second battery 702 and the second capacitor 725, a battery main switch (in the positive and/or the negative path) may be provided.

The switching arrangements 704, 705, i.e. the switches 712 to 717, 719 to 724, are controlled by a controller (not shown), e.g. a central microcontroller. Alternatively, each switching arrangement 704, 705 may be controlled by its own microcontroller, which are for example synchronized via a (fast) interface. The arrangement of the two microcontrollers may also be understood as one controller.

The circuitry including the first switching arrangement 704 and the second switching arrangement 705 can be seen as an adapted inverter circuit, namely a dual inverter circuit, for example for the hybrid engine of the vehicle 100.

Each switching arrangement 704, 705 forms an inverter by which the 12V power supply 701 (in other words the 12V power system or network) and the 48V power supply 702 (in other words the 48V power system or network) are coupled to the electrical machine 703. A DCDC converter as described with reference to FIGS. 2 and 3 is not necessary in this case. The electrical machine 703 may be conventionally operated when in one switching arrangement 704, 705 all top (i.e. switches 712, 714, 716 or switches 719, 721, 723, respectively) or all bottom (i.e. switches 713, 715, 717 or switches 720, 722, 724, respectively) are switched on (single operation). In this case, one of the switching arrangements 704, 705 acts as star point. This may be used in case of a fail of one of the inverters 704, 705 such that the motor may still be operated in such a case. This can be seen to correspond to the functionality described in context of FIG. 5.

Alternatively, for an extended operation, both power supply voltages may be added via the machine windings (combined operation). According to the current direction the electrical machine 703 may be operated as generator or as motor. Accordingly, the inverters 704, 705 may be operated in generation mode or motor mode. Further, energy may be transferred from one battery to the other battery, independent from the rotational speed of the electrical machine.

It should further be noted that with the circuit arrangement 700, a freewheeling of the electrical machine is uncritical and no undesired generator operation occurs since the electromotive force is not concatenated and the sum voltage of the power supplies acts as counter voltage.

The controller may control the switching arrangements 704, 705 such that the voltage seen by the electrical machine 703 is a combination of the voltages of the batteries 701, 702. Thus, in case of a 12V battery and a 48V battery, voltages of +/−12V, +/−48V, +/−60V, +/−36V and 0V may be supplied to the electrical machine 703. By applying such a multi-level voltage to the electrical machine 703, the efficiency of the electrical machine may be increased.

It should further be noted that the ground terminal for the 12V power supply and the ground terminal for the 48V power supply may be separated to increase the electromagnetic compatibility.

On the other hand, the circuit arrangement 700 requires a ground connection from the second battery 702, possibly additional machine terminals and more circuitry in the form of the switching arrangements 704, 705 (this may however be compensated by the fact that no DCDC converter is necessary). The inverters 704, 705 may be integrated in (or at) the electrical machine 703 to keep the costs for additional machine terminals low. For example, the inverters 704, 705 are axially or radially integrated at the machine 703 (optimizing the installation space) instead of using machine cabling for the coupling.

Current measurement, e.g. as basis for the controlling of the inverters 704, 705 may be done in the motor phases or in a common source path such that no additional current sensors are necessary.

A connection with low inductivity between the inverters 704, 705 is not necessary. The inverters can be implemented as standard separate three-phase inverters 704, 705. The maximum block voltage of the inverters 704, 705 is for example selected with reference of the respective power supply voltage. For example, for the first inverter 704 (for the 12V power supply) 30V/40V MOSFETs may be used and for the second inverter 705 (for the 48V power supply) 48V MOSFETs may be used. The maximum voltage which is applied to one of the switches 712 to 717, 719 to 723 is determined by the respective power supply.

In the following, a transfer of DC current through the electrical machine 703 between the batteries 701, 702 and a corresponding control of the inverters 704, 705 is described in more detail. In should be noted that this may be seen to correspond to the control described with reference to the circuit arrangement 400.

Figure 8:
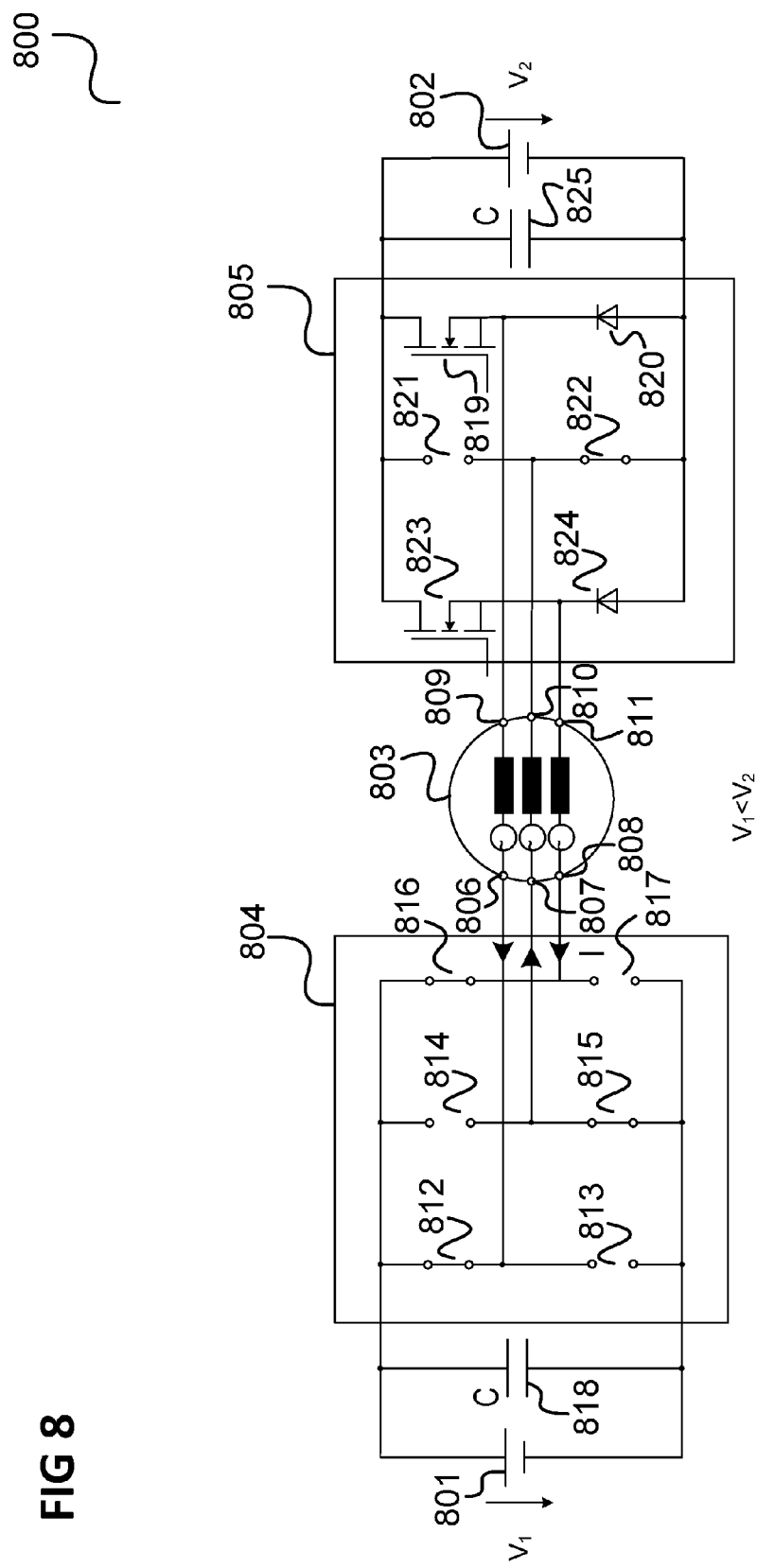
FIG. 8 shows a circuit arrangement.

A setting of the switches 712 to 717, 719 to 723 such that the circuit arrangement 700 operates as a step-down converter is illustrated in FIG. 8.

FIG. 8 shows a circuit arrangement 800.

Corresponding to FIG. 7, the circuit arrangement 800 includes a first battery 801, a second battery 802, an electrical machine 803 including terminals 806 to 811, a first switching arrangement 804 including switches 812 to 817 and a second switching arrangement 805 including switches 819 to 823.

In the example in FIG. 8, the state of the switches 812 to 817, 819 to 823 is such that the circuit arrangement (dual inverter) functions as DCDC step-down converter.

Specifically, the first switch 812, the fourth switch 815 and the fifth switch 816 of the first switching arrangement 804 are (constantly) closed, while the second switch 813, the third switch 814 and the sixth switch 817 of the first switching arrangement 804 are (constantly) opened. The third switch 821 of the second switching arrangement 821 is (constantly) opened and the fourth switch 822 of the second switching arrangement 821 is (constantly) closed. The second switch 820 and the sixth switch 824 of the second switching arrangement 821 are used as diodes (e.g. the freewheeling diodes (body diodes) of MOSFETs) but may also be switched actively (for an active rectifier) to reduce loss. For example, a MOSFET may conduct in reverse direction and its resistance when switched on is typically lower than the forward resistance of the body diode.

The first switch 819 and the fifth switch 823 of the second switching arrangement 821 are switched (e.g. simultaneously, i.e. to be on at the same time and off at the same time) and the relation between the voltage at the first battery V1 and the voltage at the second battery V2 is given by the relation between on-time and off-time a according to $$V_1/V_2 = a.$$

The first switch 819 and the fifth switch 823 may also be switched with an offset (i.e. with a delay between the switching of the switches 819, 823) while having the same relation between on-time and off-time for the two switches 819, 823.

Figure 9:
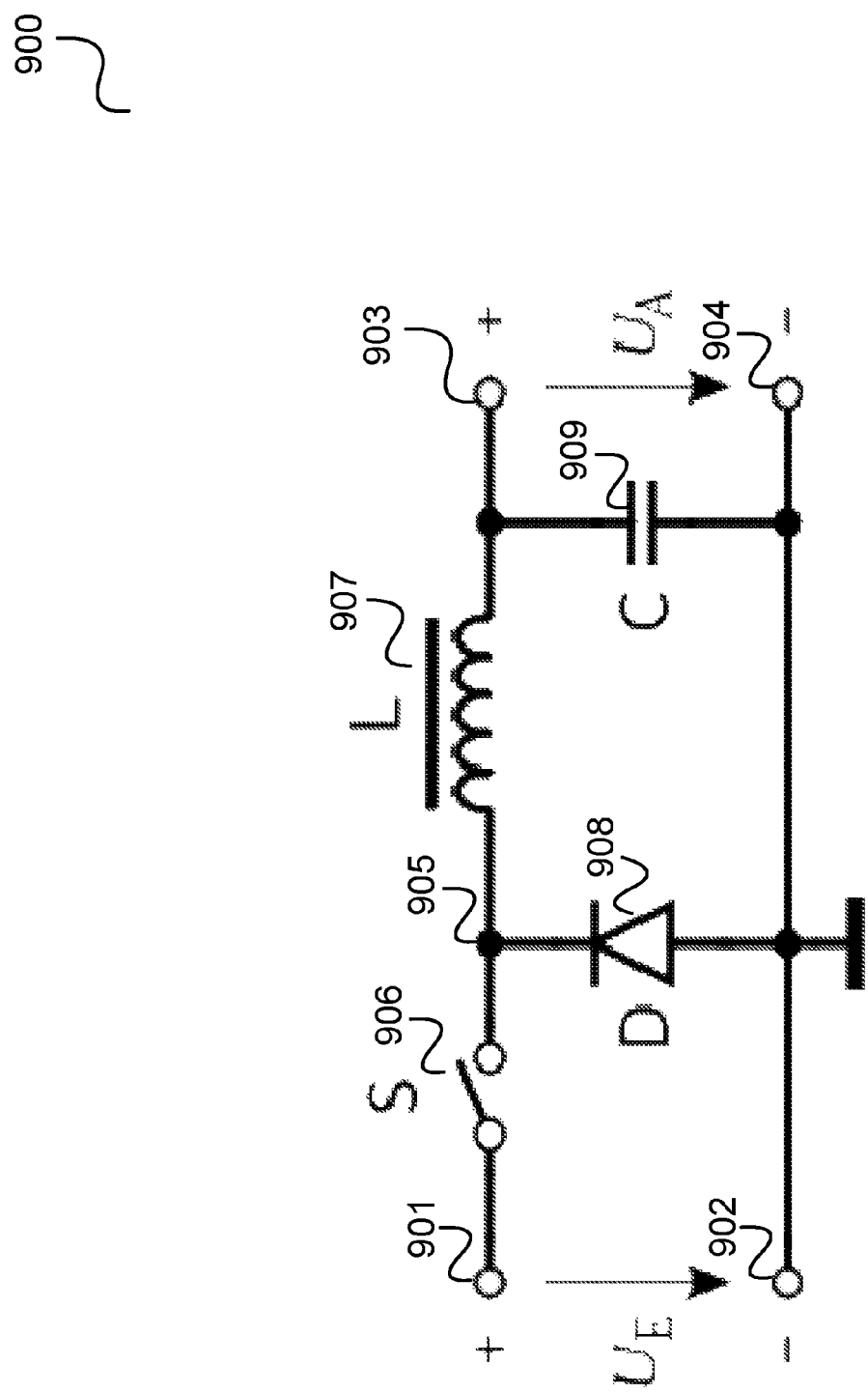
FIG. 9 shows a circuit.

An equivalent circuit to the circuit arrangement in this mode of operation is shown in FIG. 9.

FIG. 9 shows a circuit 900.

The circuit has an input voltage $U_E$ (corresponding to $V_1$) between input terminals 901, 902 and an output $U_A$ (corresponding to $V_2$) between output terminals 903, 904.

The positive input terminal 901 is connected via a switch 906 (corresponding to switches 919, 923) to a node 905 which is coupled via an inductor 907 (corresponding to the inductance of the machine 702) to the positive output terminal 903. A diode 908 (corresponding to the switches 720, 724) is coupled between the negative input/output terminals 902, 904 (anode) and the node 905 (cathode). Further, a capacitor 909 is coupled between the output terminals 903, 904.

Figure 10:
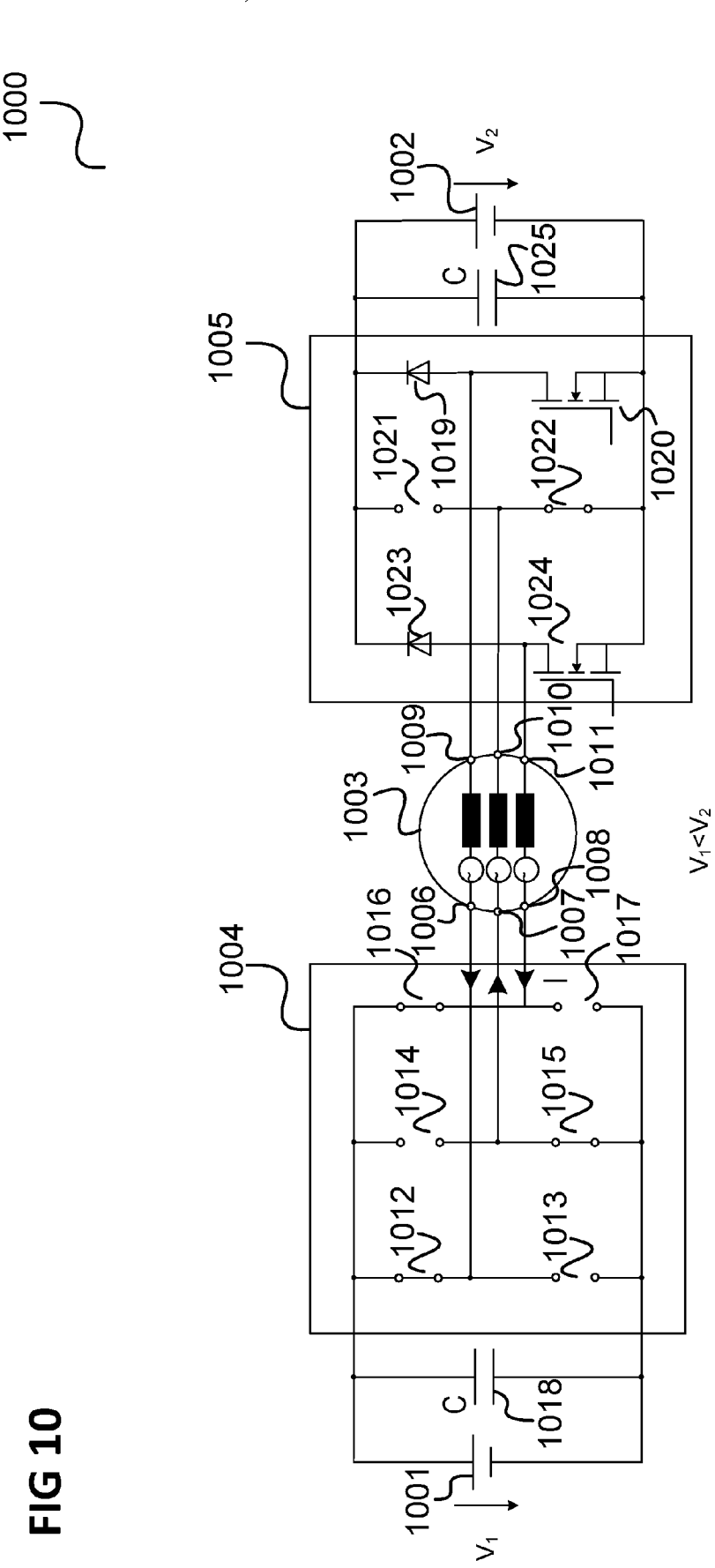
FIG. 10 shows a circuit arrangement.

A setting of the switches 712 to 717, 719 to 723 is illustrated such that the circuit arrangement 700 operates as a boost converter is illustrated in FIG. 10.

FIG. 10 shows a circuit arrangement 1000.

Corresponding to FIG. 7, the circuit arrangement 1000 includes a first battery 1001, a second battery 1002, an electrical machine 1003 including terminals 1006 to 1011, a first switching arrangement 1004 including switches 1012 to 1017 and a second switching arrangement 1005 including switches 1019 to 1023.

In the example in FIG. 8, the state of the switches 1012 to 1017, 1019 to 1023 is such that the circuit arrangement (dual inverter) functions as DCDC boost converter.

Specifically, the first switch 1012, the fourth switch 1015 and the fifth switch 1016 of the first switching arrangement 1004 are (constantly) closed, while the second switch 1013, the third switch 1014 and the sixth switch 1017 of the first switching arrangement 1004 are (constantly) opened. The third switch 1021 of the second switching arrangement 1021 is (constantly) opened and the fourth switch 1022 of the second switching arrangement 1021 is (constantly) closed.

The first switch 1019 and the fifth switch 1023 of the second switching arrangement 1021 are used as diodes to serve as rectifier.

The second switch 820 and the sixth switch 824 of the second switching arrangement 821 are switched (e.g. simultaneously, i.e. to be on at the same time and off at the same time) according to PWM (Pulse Width Modulation) and the relation between the voltage at the first battery V2 and the voltage at the second battery V1 (amplification factor) is given by the relation between on-time and off-time a according to $$\frac{V_2}{V_1} = \frac{1}{1-a}.$$

Figure 11:
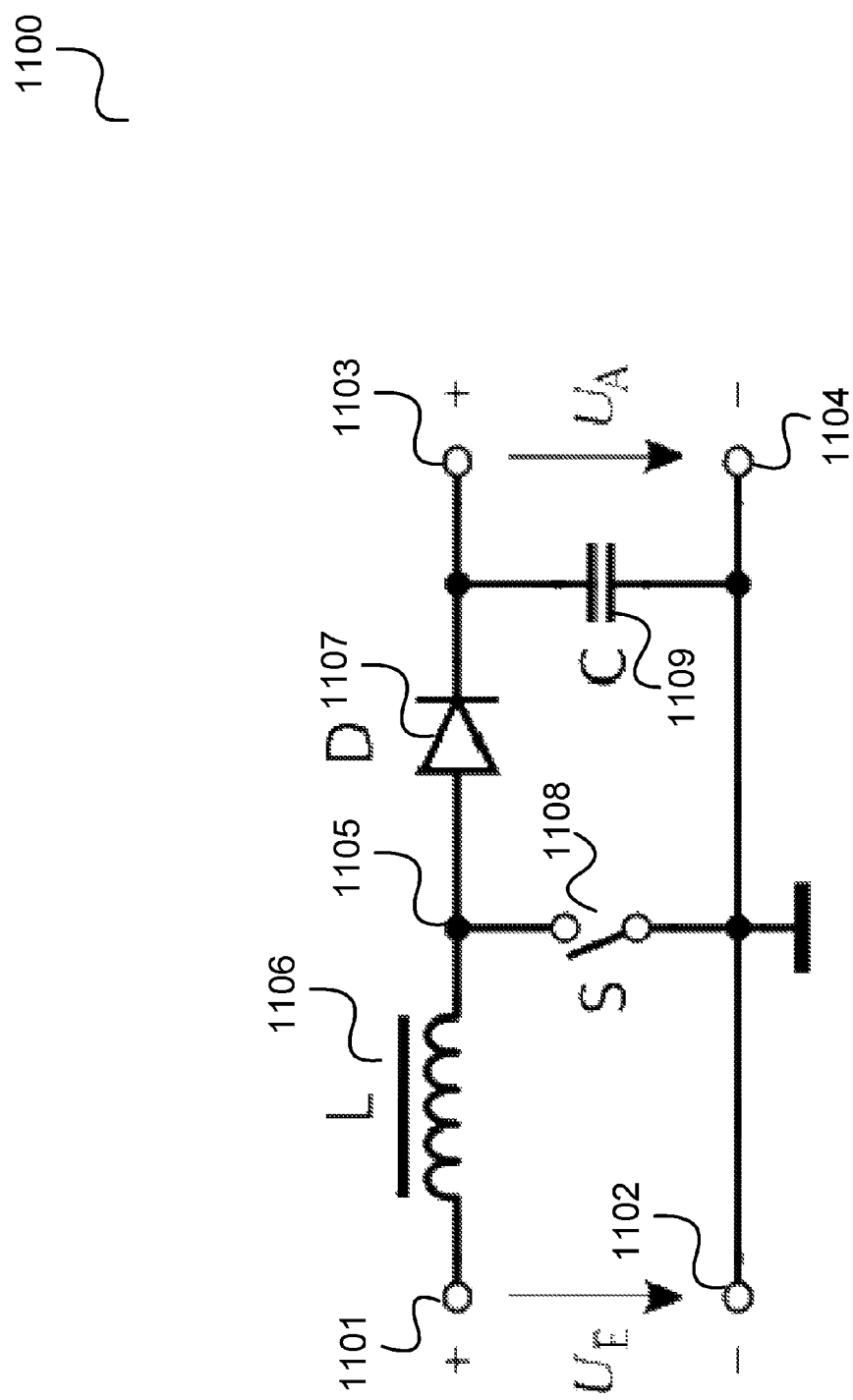
FIG. 11 shows a circuit.

An equivalent circuit to the circuit arrangement in this mode of operation is shown in FIG. 11.

FIG. 11 shows a circuit 1100.

The circuit has an input voltage $U_E$ (corresponding to $V_1$) between input terminals 1101, 1102 and an output $U_A$ (corresponding to $V_2$) between output terminals 1103, 1104.

The positive input terminal 1101 is connected via an inductor 1106 (corresponding to the inductance of the machine 702) to a node 1105 which is coupled via a diode 1107 to the positive output terminal 1103.

A switch 1108 (corresponding to the switches 720, 724) is coupled between the negative input/output terminals 1102, 1104 and the node 1105.

Further, a capacitor 1109 is coupled between the output terminals 1103, 1104.

The switching arrangement 704, 705 is active whose power supply 701, 702 (i.e. the power supply 701, 702 it couples to the electrical machine 703) has the greater voltage, i.e. in the configurations of FIGS. 8 and 9, $V_1 < V_2$, thus the second switching arrangement 805, 1005 is active.

The two switched phases each carry half of the current and the non-switched phase carries the full current. This is of advantage for loss balancing.

Alternatively, for the DCDC operation a single phase may be used (for switching) instead of two. However, a higher ripple current is to be expected in this case. Further, two bridges of the (switched) inverter 805, 1005 may be constantly switched on. So, the switched inverter 805, 1005 needs one switched bridge and at least one bridge that is constantly switched on. In the non-switched inverter 804, 1004, those bridges are constantly switched on (connected to the positive terminal of the first power supply 801, 1001) which correspond to bridges (i.e. to the same phase) of the switched inverter 805, 1005 that are switched.

Further, the current flows via the closed switch of the middle bridge (i.e. closed switch 722, being a freewheeling diode) back to the second power supply 802, 1002. This does not limit the functionality.

The functionality of handling an error on one of the sides as explained with reference to FIG. 5 is explained in more detail in the following with reference to FIG. 12.

Figure 12:
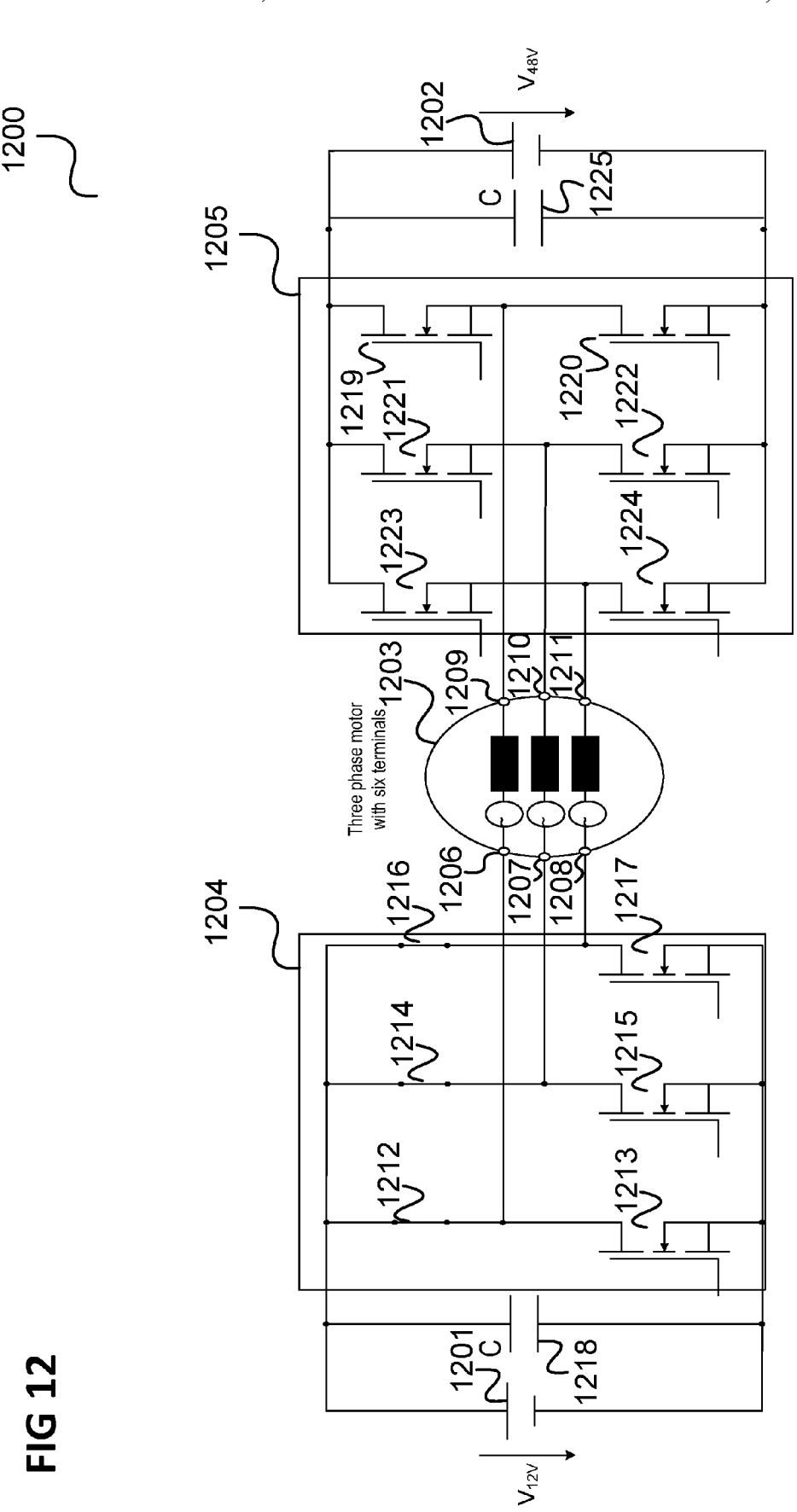
FIG. 12 shows a circuit arrangement.

FIG. 12 shows a circuit arrangement 1200.

Corresponding to FIG. 7, the circuit arrangement 1200 includes a first battery 1201, a second battery 1202, an electrical machine 1203 including terminals 1206 to 1211, a first switching arrangement 1204 including switches 1212 to 1217 and a second switching arrangement 1205 including switches 1219 to 1223.

In the example in FIG. 12, it is assumed that there is a failure on the side of the first switching arrangement 1205, e.g. a failure of one of the switches 1212 to 1217, in this example the sixth switch 1217 such that it is constantly open, or some failure of the first battery 1201.

For example, the controller of the second switching arrangement 1205 detects the failure and, as illustrated in FIG. 12, in response short circuits the terminals 1206, 1207, 1208 of the electrical machine by closing the upper switches 1212, 1214, 1216.

It should be noted that the upper switches 1212, 1214, 1216 are closed in this example because a failure of the sixth switch 1217 which is a lower switch is assumed. In case one of the upper switches 1212, 1214, 1216 fails or the first battery fails 1201 the lower switches 1213, 1215, 1217 may be closed alternatively.

In the following, a control of the switching arrangements 704, 705 such that the electrical machine operates as a generator for one of the batteries 701, 702 while it is driven as a motor by the other battery 701, 702 is described in more detail. In should be noted that this may be seen to correspond to the control described with reference to the circuit arrangement 600.

An inverter can generate an output voltage independent from the output current. This allows an operation in four quadrants: positive output voltage and positive current, positive output voltage and negative current, negative output voltage and positive current and negative output voltage and negative current. In motor operation, this corresponds to braking and accelerating in the two rotation directions.

For example, the first inverter 704 may accelerate the machine 703 in forward direction using a standard controlling scheme (e.g. based on space vector modulation or field-oriented control) and the second inverter 705 may brake the engine (running in forward direction) using a standard controlling scheme. Thus, the first inverter 704 is in motor operation mode and the second inverter 705 is in generator operation mode, i.e. the machine 703 is powered as a motor by the first battery 701 and acts as a generator for the second battery 702. Virtually, the first inverter 704 sees a stronger motor (with more power consumption and higher voltage) and the second inverter 705 a weaker motor in generator operation. Accordingly, the first inverter 704 supplies the motor power as well as the generator power for the second inverter 705 and the second battery 702. The motor current stays unchanged irrespective of whether energy is transferred between the batteries 701, 702. Only the voltages change.

In contrast to this operation, the voltages of both batteries 701, 702 may be combined to generate more power of the machine 703.

Figure 13:
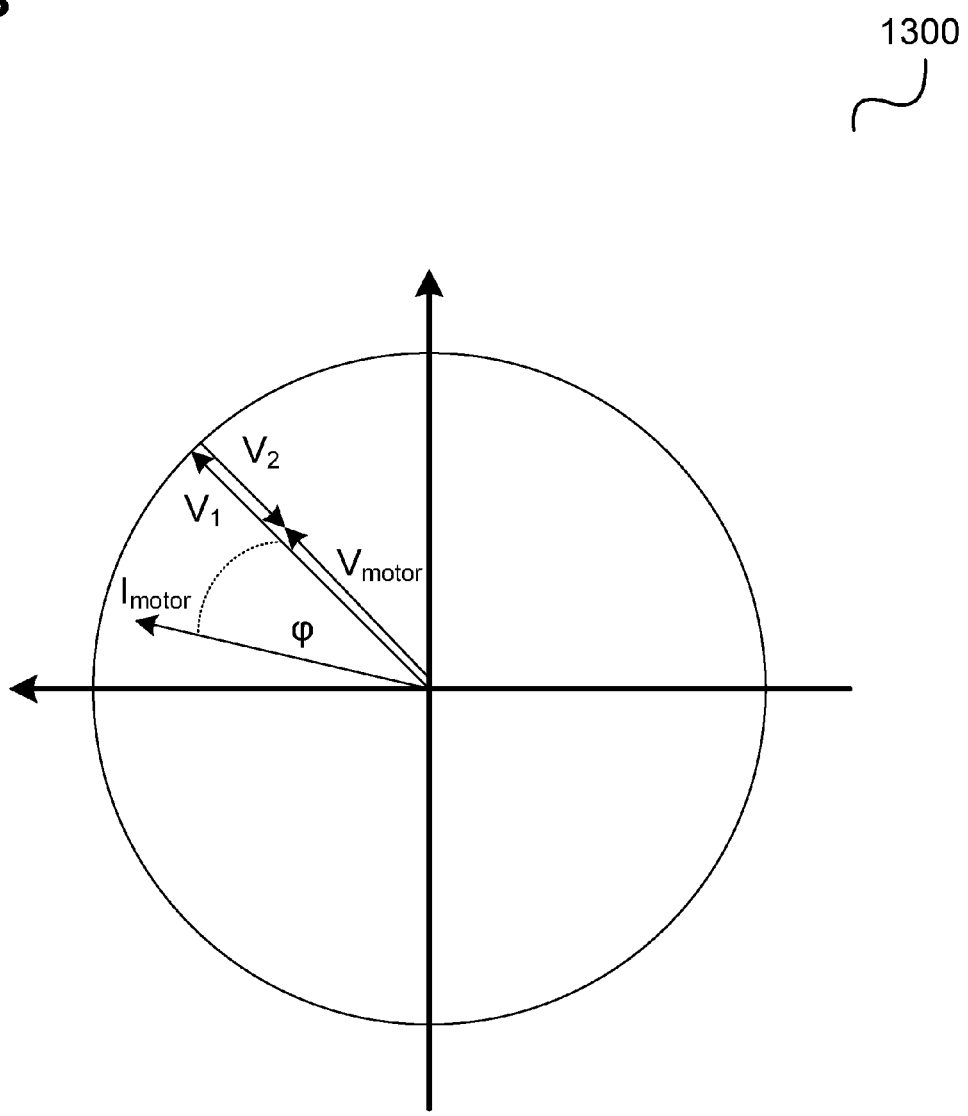
FIG. 13 shows a vector diagram.

FIG. 13 shows a vector diagram 1300.

The vector diagram 1300 illustrates an operating point in which the first inverter 701 is in motor operation mode and the second inverter 702 is in generator operation mode. $V_{motor}$ denotes the engine voltage, $I_{motor}$ the engine current, and $\varphi$ the phase difference between engine voltage and engine current.

The power supplied by the first battery $P_1$ and the power supplied by the second battery $P_2$ are given by $$P_1 = V_1 \cdot I_{motor} \cdot \cos \rho \text{ and}$$

$$P_2 = -V_2 \cdot I_{motor} \cdot \cos \rho.$$

In this example, $P_1$ is positive and $P_2$ is negative.

Figure 14:
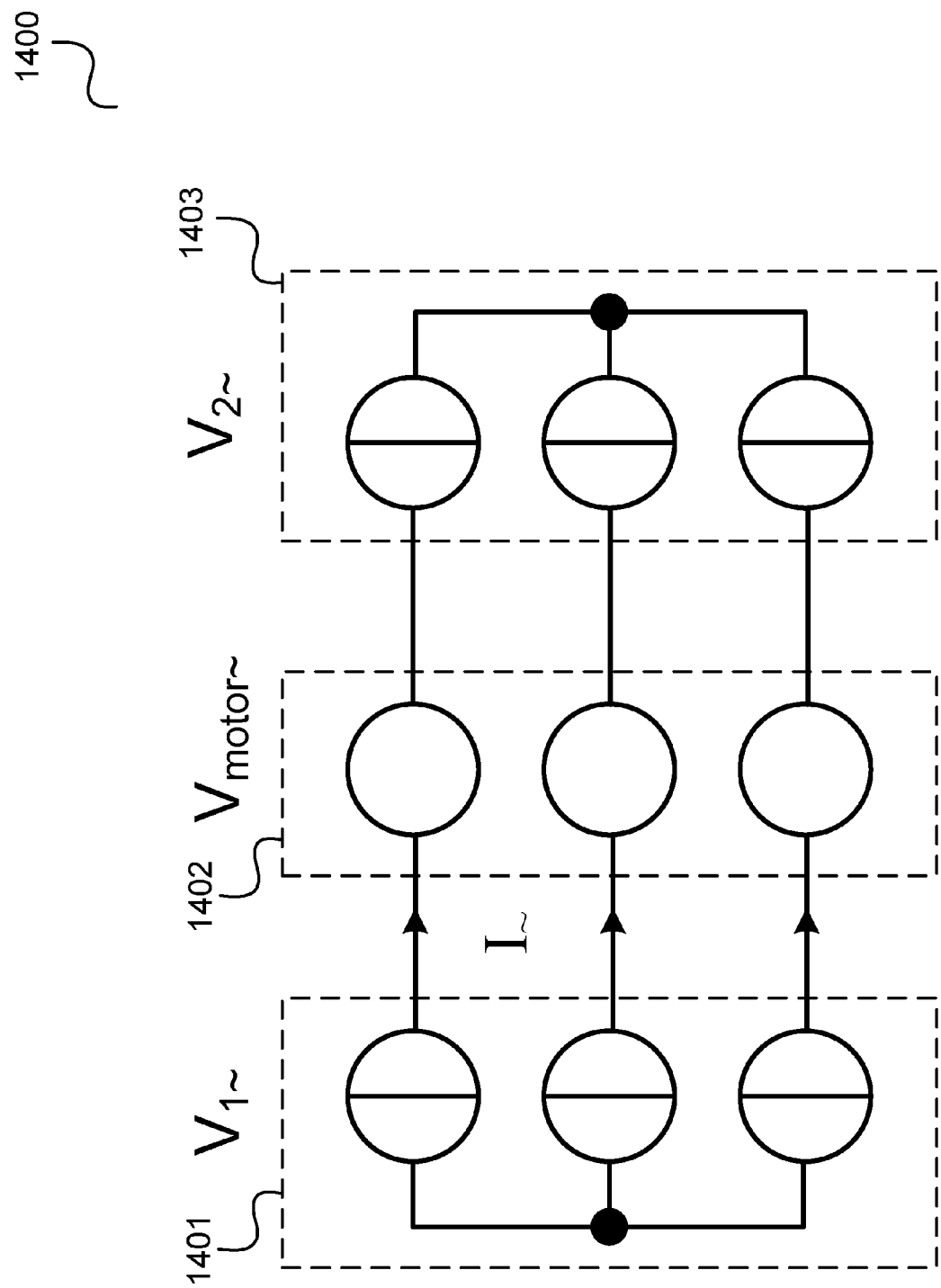
FIG. 14 shows a circuit.

An equivalent circuit to the circuit arrangement in this mode of operation is shown in FIG. 14.

FIG. 14 shows a circuit 1400.

The circuit 1400 is a series connection (with three phases in parallel) of a first voltage source 1401 (corresponding to the first battery 701 and the first inverter 704), a second voltage source 1402 (corresponding to the second battery 702 and the second inverter 705) and a motor 1403 (corresponding to the engine 703). The output voltages of the first voltage source 1401 and the second voltage source 1402 are added at the motor 1403.

Figure 15:
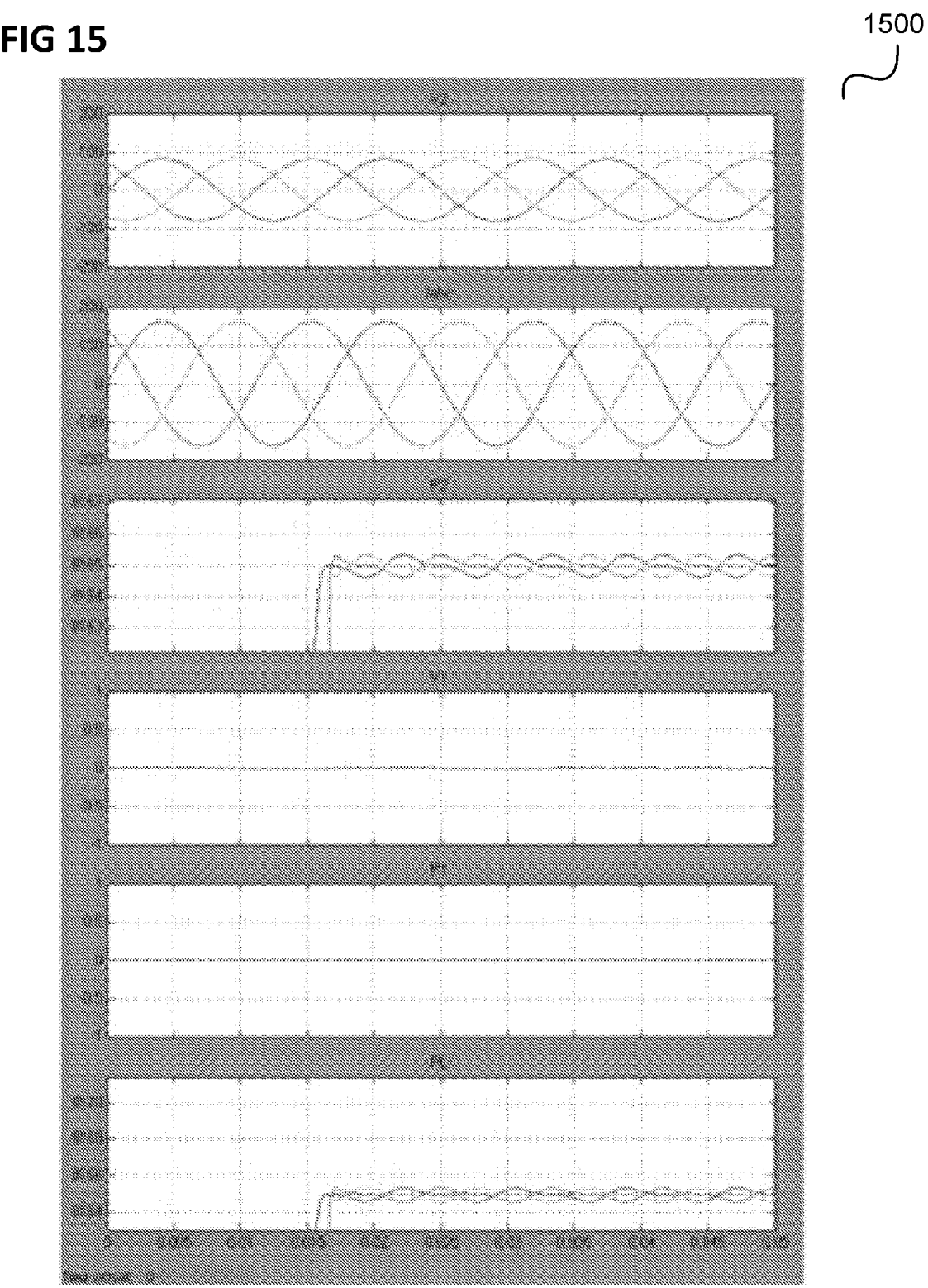
FIG. 15 shows a voltage/power/current diagram.
Figure 16:
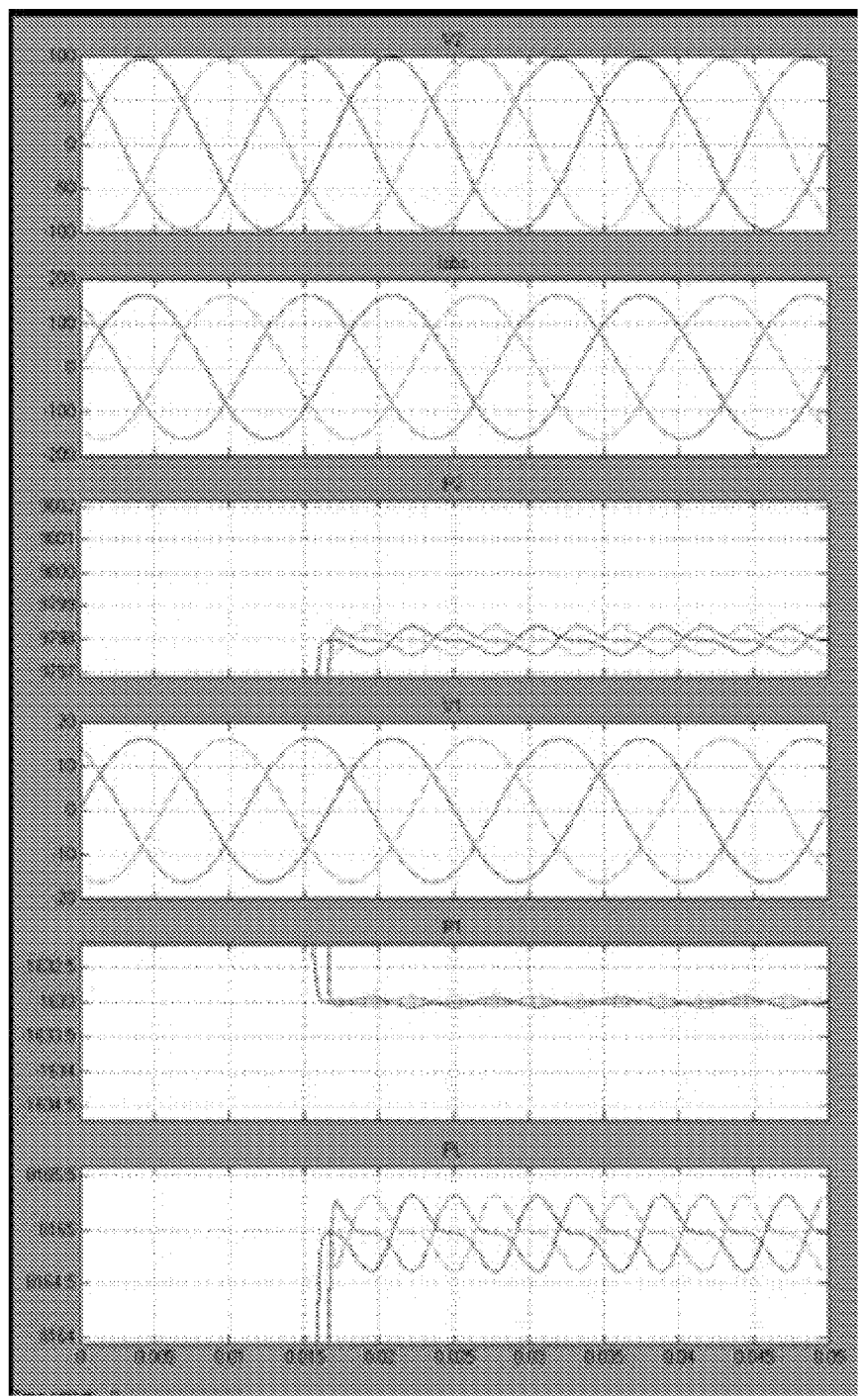
FIG. 16 shows a voltage/power/current diagram.

Examples for the operation of the circuit arrangement 700 (as for example based on a simulation) is illustrated in FIGS. 15 and 16.

FIGS. 15 and 16 show voltage/power/current diagrams 1500, 1600.

The diagrams 1500, 1600 shows the voltage $V_1$ of the three phases at the first battery side terminals 706, 707, 708, the voltage $V_2$ of the three phases at the second battery side terminals 709, 710, 711, the power supplied to the machine by the first inverter $P_1$, the power supplied to the machine by the second inverter $P_2$ and the power at the load $P_L$.

FIG. 15 illustrates the case that only the second inverter 705 is active and the first inverter 704 is short-circuited as explained above with reference to FIG. 12. Accordingly, the voltage $V_1$ and power $P_1$ are zero.

FIG. 16 illustrates the case that the first inverter 704 is in generator operation mode and accordingly applies a voltage to the machine 703 that is opposing the voltage applied to the machine 703 by the second inverter 705.

The voltage supplied by the second inverter 705 was increased by the voltage applied by the first inverter 704 such that at the load (i.e. the machine 703) the current stays the same and for the load nothing changes. In this case, energy is transferred from the second battery 702 to the first battery 701.

Figure 17:
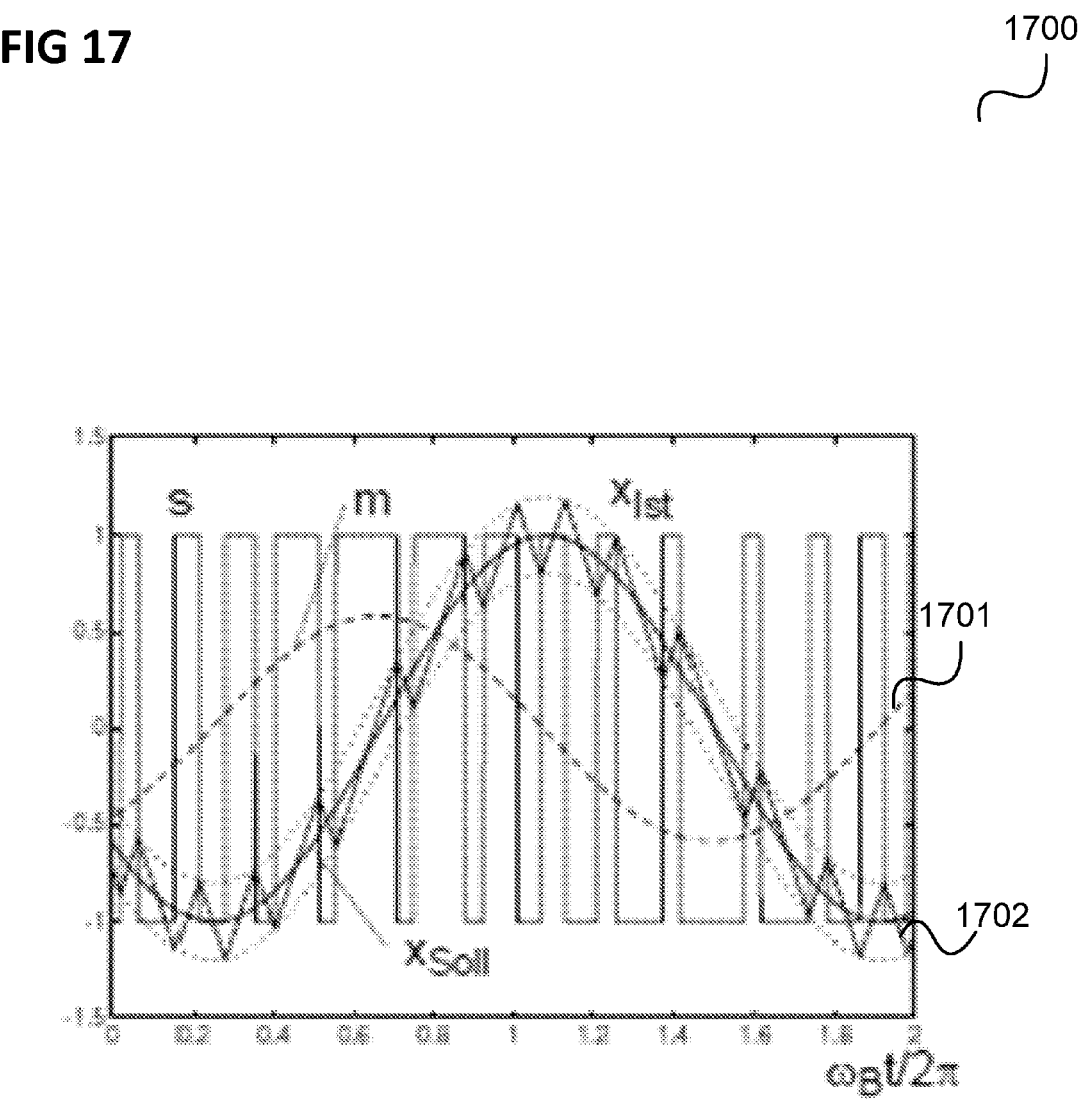
FIG. 17 shows a current/voltage diagram.

FIG. 17 shows a current/voltage diagram 1700.

The diagram 1700 illustrates the modulation of the output voltage and the output current of an inverter bridge. The amplitude of the fundamental wave of the voltage 1701 may be set via the pulse width (in a PWM). The current can be determined as integral of the voltage at the inductive load (jagged line 1702).

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

What is claimed is:

1. A circuit arrangement comprising:
   a first battery;
   a second battery;
   an electrical machine connected between the first battery and the second battery wherein the electrical machine is connected to the first battery via a first switching arrangement and the electrical machine is connected to the second battery via a second switching arrangement;
   a controller configured to control the first switching arrangement and the second switching arrangement such that a current that has a DC component flows through the electrical machine.

2. The circuit arrangement of claim 1, wherein the first switching arrangement is coupled to the electrical machine via a multi-phase connection and the second switching arrangement is coupled to the electrical machine via a multi-phase connection.

3. The circuit arrangement of claim 1, wherein the machine is a three-phase machine and the first switching arrangement is coupled to the electrical machine via a three-phase connection and the second switching arrangement is coupled to the electrical machine via a three-phase connection.

4. The circuit arrangement of claim 1, wherein the electrical machine has three branches, wherein each branch has a first terminal connected to the first battery via the first switching arrangement and a second terminal connected to the second battery via the second switching arrangement.

5. The circuit arrangement of claim 1, wherein the controller is configured to control the first switching arrangement and the second switching arrangement such that a current that has a DC component flows through at least one of the branches of the electrical machine.

6. The circuit arrangement of claim 1, wherein the controller is configured to control the first switching arrangement and the second switching arrangement such that a current that has a DC component flows through the electrical machine DC component above a pre-determined threshold.

7. The circuit arrangement of claim 1, wherein the controller is configured to control the first switching arrangement and the second switching arrangement such that a current that has a DC component flows from the first battery to the second battery via the electrical machine.

8. The circuit arrangement of claim 1, wherein at least one of the first switching arrangement and the second switching arrangement is an inverter.

9. The circuit arrangement of claim 1, wherein the controller is configured to control the first switching arrangement and the second switching arrangement such that the first switching arrangement, the electrical machine and the second switching arrangement act as a DCDC converter.

10. The circuit arrangement of claim 1, wherein a controller is configured to control the first switching arrangement and the second switching arrangement such that the first switching arrangement, the electrical machine and the second switching arrangement act as a step-down converter or a boost converter.

11. The circuit arrangement of claim 1, wherein the electrical machine is a vehicle motor.

12. The circuit arrangement of claim 1, wherein the first battery and the second battery are vehicle batteries.

13. The circuit arrangement of claim 1, wherein the first battery and the second battery have different voltages.

14. The circuit arrangement of claim 1, wherein the first battery is a 12V car battery and the second battery is a 48V car battery.

15. A method for operating an electrical machine comprising
controlling a first switching arrangement, via which a first battery is coupled with the electrical machine, and a second switching arrangement, via which a second battery is coupled with the electrical machine, such that a current that has a DC component flows through the electrical machine.

16. A circuit arrangement comprising:
a first battery;
a second battery;
an electrical machine connected between the first battery and the second battery wherein the electrical machine is connected to the first battery via a first switching arrangement and the electrical machine is connected to the second battery via a second switching arrangement and wherein the electrical machine is connected to the second switching arrangement via a plurality of terminals; and
a controller configured to control the second switching arrangement, in response to the detection of an error of the second switching arrangement or the second battery, such that the terminals are short-circuited by means of the second switching arrangement.

17. The circuit arrangement of claim 16, wherein the electrical machine has three branches, wherein each branch is connect to the second switching arrangement by means of one terminal of the plurality of terminals.

18. The circuit arrangement of claim 16, further comprising a detector configured to detect the error of the second switching arrangement or the second battery.

19. The circuit arrangement of claim 16, wherein the second switching arrangement comprises a plurality of switches and the error of the switching arrangement is a failure of one of the plurality of switches.

20. A method for operating an electrical machine comprising
controlling a switching arrangement, via which a battery is coupled with the electrical machine via a plurality of terminals, such that the terminals are short-circuited by means of the switching arrangement in response to the detection of an error of the switching arrangement or the battery.

21. A circuit arrangement comprising:
a first battery;
a second battery;
an electrical machine connected between the first battery and the second battery wherein the electrical machine is connected to the first battery via a first switching arrangement and the electrical machine is connected to the second battery via a second switching arrangement;
a controller configured to control the first switching arrangement and the second switching arrangement such that the first battery supplies electric power to drive the electrical machine and the electric machine supplies power to the second battery to charge the second battery.

22. The circuit arrangement of claim 21, wherein the first switching arrangement and the second switching arrangement are inverters and are controlled based on space vector modulation or field oriented control.

23. A method for operating an electrical machine comprising
controlling a first switching arrangement, via which a first battery is coupled with the electrical machine and a second switching arrangement, via which a second battery is coupled with the electrical machine such that the first battery supplies electric power to drive the electrical machine and the electric machine supplies power to the second battery to charge the second battery.

* * * * *